(12) United States Patent  
Hunter (10) Patent No.: US 8,814,371 B2  
(45) Date of Patent: Aug. 26, 2014

(54) MOTORCYCLE BLIND SPOT MIRROR (75) Inventor: Stephen Hunter, Ayrshire (GB)

(73) Assignee: Hunter Create Limited, Kilmarnock, Ayrshire (GB)

( * ) Notice: Subject to any disclaimer, the term of this patent is extended or adjusted under 35 U.S.C. 154(b) by 0 days.

(21) Appl. No.: 13/703,129

(22) PCT Filed: Jun. 10, 2011

(86) PCT No.: PCT/GB2011/000870
§ 371 (c)(1),
(2), (4) Date: Feb. 13, 2013

(87) PCT Pub. No.: WO2011/154702
PCT Pub. Date: Dec. 15, 2011

(65) Prior Publication Data
US 2013/0155533 A1 Jun. 20, 2013

(30) Foreign Application Priority Data

Jun. 10, 2010 (GB) .................................... 1009694.9
Jun. 14, 2010 (GB) .................................... 1009917.4

(51) Int. Cl.
G02B 5/10 (2006.01)
B62J 29/00 (2006.01)
B60R 1/00 (2006.01)
(52) U.S. Cl.
CPC . B60R 1/007 (2013.01); B62J 29/00 (2013.01)
USPC .......................................... 359/842; 359/850

(58) Field of Classification Search
USPC .......................... 359/838, 842, 868, 871–877
See application file for complete search history.

(56) References Cited

U.S. PATENT DOCUMENTS 2,261,692 A * 11/1941 Manley .......................... 359/608
4,264,144 A * 4/1981 McCord ........................ 359/868
2005/0088766 A1* 4/2005 Daviss ........................... 359/842

FOREIGN PATENT DOCUMENTS

DE 43 24 501 C1 12/1994
FR 2 934 535 A1 2/2010
JP 11-115634 4/1999

OTHER PUBLICATIONS

International Search Report for PCT Application No. PCT/GB2011/000870 mailed Aug. 2, 2011.
PCT Written Opinion for PCT Application No. PCT/GB2011/000870 mailed Aug. 2, 2011.

* cited by examiner

Primary Examiner — Ricky Mack
Assistant Examiner — Robert E Tallman
(74) Attorney, Agent, or Firm — RatnerPrestia (57) ABSTRACT A wide angle center mounted motorcycle blind spot mirror that is mounted forward and above the motorcycle instrument panel clocks directly in the riders line of view that will give full visual coverage of the riders blind spot areas including the rider also, the mirror, can have several mounting points including the fly screen, fairing, headlamp, handle bars or the like.

19 Claims, 9 Drawing Sheets

MOTORCYCLE BLIND SPOT MIRROR

This application is the U.S. National Phase Application of PCT/GB2011/000870, filed Jun. 10, 2011, which claims the priority of United Kingdom Patent Application Nos. GB 1009694.9, filed Jun. 10, 2010 and GB 1009917.4, filed Jun. 14, 2010, the contents of such applications being incorporated by reference herein.

INTRODUCTION

The present invention relates to a blind spot mirror for use on motorcycles.

BACKGROUND

A blind spot in a vehicle such as a motorcycle is an area around the vehicle that cannot be directly observed by the driver while at the controls, and facing a given direction. When riding a motorcycle, blind spots are the areas of the road that cannot be seen while looking forward or through either of the rear-view mirrors. The most common are the rear blind spots, areas towards the rear of the vehicle on both sides. Vehicles in the adjacent lanes of the road that fall into these blind spots may not be visible using only the motor cycle's mirrors. The term motorcycle includes any and all 2, 3 or 4 wheeled vehicle which has a driver positioned centrally. This includes but is not limited to motorcycles, motor scooters, mopeds and quad-bikes.

Good rearward vision is critical to safety for motorcycle riders. This is particularly true when riding in traffic, where safety is insured only by constant vigilance and awareness of the whereabouts and movements of surrounding vehicles. Rear view mirrors have long been used on motorcycles for this purpose. These mirrors are generally mounted on the handlebars, below eye level, where they are directed to give a rearward view over the rider's hands and forearms.

As a general rule, because the motor cycle rear view mirrors have a limited field of view, the rider must choose between good rearward coverage and good side coverage. Most riders will choose a compromise setting, something less than ideal for both side and rear vision.

Additional equipment that can help eliminate blind spots are "fisheye mirrors" or "bubble mirrors". Such mirrors are normally small relative to the size of the rear view mirror and are stuck to the existing rear view mirror with an adhesive. These mirrors can bring blind spots into view, but their optical properties impart a great deal of distortion so as to make it difficult to judge distances. "The high level of distortion is a consequence of their small size which is required to allow the mirrors to be positioned on the existing rear view mirrors.

In summary, motorcyclists are in great danger from other road traffic and hazards that are in the riders blind spot as conventional mirrors only cover the area behind the motorcyclist. Other wide angle motorcycle mirrors are mounted to the side of the rider on the existing mirrors and are not in the riders forward line of view.

SUMMARY OF THE INVENTION

In accordance with a first aspect of the invention there is provided a mirror assembly for viewing the blind spot behind a motorcycle rider, the mirror assembly comprising:
a mirror with a reflecting surface which is curved along at least part of a major axis of the reflecting surface and along at least part of a minor axis of the reflecting surface to reflect light from positions at a wide angle of view;
mounting means for positioning the mirror centrally upon the motorcycle, wherein, the curvature of the reflecting surface and the central mounting of the mirror allow a rider to have sight of the area to the side and rear of the motorcycle in addition to the area viewable in side mounted rear view mirrors.

Preferably, the mirror assembly reflects a reference object which is viewable by the rider. This allows the rider to quickly assess the position of an object relative to the reference object. The reference object may be the rider.

Preferably, the reflecting surface provides a view of at least 170° to the rear and side of the motorcycle, in use.

Preferably, the reflecting surface provides a view of at least 180° to the rear and side of the motorcycle, in use.

Preferably the reflecting surface is a substantially convex in shape.

Preferably the reflecting surface is arranged in three sections along a major axis of the reflecting surface.

Preferably, the three sections comprise a central section and two peripheral sections.

Preferably at least two of the three sections have a different radius of curvature.

More preferably all of the sections have a different radius of curvature.

Preferably the reflecting surface is arranged in three sections along a minor axis of the reflecting surface.

Preferably, the three sections comprise a central section and two peripheral sections.

Preferably at least two of the three sections have a different radius of curvature.

More preferably all of the sections have a different radius of curvature.

Preferably, the mirror comprises a top surface which projects outwards above the reflecting surface. The projection may act as a shade.

Preferably, the mirror further comprises a reference guide positioned beside the mirror which has a scale that marks the angle between the centre of the motorcycle and positions upon the reflecting surface such that a rider may judge the angle between the rider and an object viewed in the reflecting surface of the mirror.

Preferably, the coupling comprises connection means for removably attaching the mirror assembly to a motorcycle.

Preferably, the connection means comprises at least one connector which is attachable to a surface of the motorcycle and mounting means to which the mirror assembly may be removably attached.

Preferably, the mounting means is an elongate member adapted to receive at least one coupling on the mirror assembly.

Preferably, the connection means comprises a pair of connectors which are spaced apart.

Preferably, the at least one connector is pivotably connected to the mounting.

In accordance with a second aspect of the invention there is provided a kit of parts for the mirror assembly and mounting means if the first aspect of the invention.

In one aspect, the invention relates to a motorcycle centre mounted wide angle mirror directly in the riders forward line of view.

Preferably, the wide angle centre mounted mirror gives at least 170 degrees of coverage, including the rider.

Preferably, the mirror is a wide angle centre mounted convex mirror.

Preferably, the mirror gives 180 degrees of coverage, including the rider.

Preferably, wide angle centre mounted mirror gives good vertical coverage due to the increased curvature of the mirror at C and D.

Preferably, the wide angle centre mounted mirror is mounted below the rider's eye height

BRIEF DESCRIPTION OF THE DRAWINGS

The present invention will now be described by way of example only with reference to the accompanying drawings in which.

DETAILED DESCRIPTION OF THE DRAWINGS

The present invention provides a mirror assembly which allows a rider to quickly determine the presence of other objects by showing the reflection of these objects. The location and curvature of the mirror allows the rider to need only a quick glance at the mirror to determine whether there is an object which may a danger to the rider. The rider can then look more carefully in the direction of the object and take evasive action if necessary.

Figure 1:
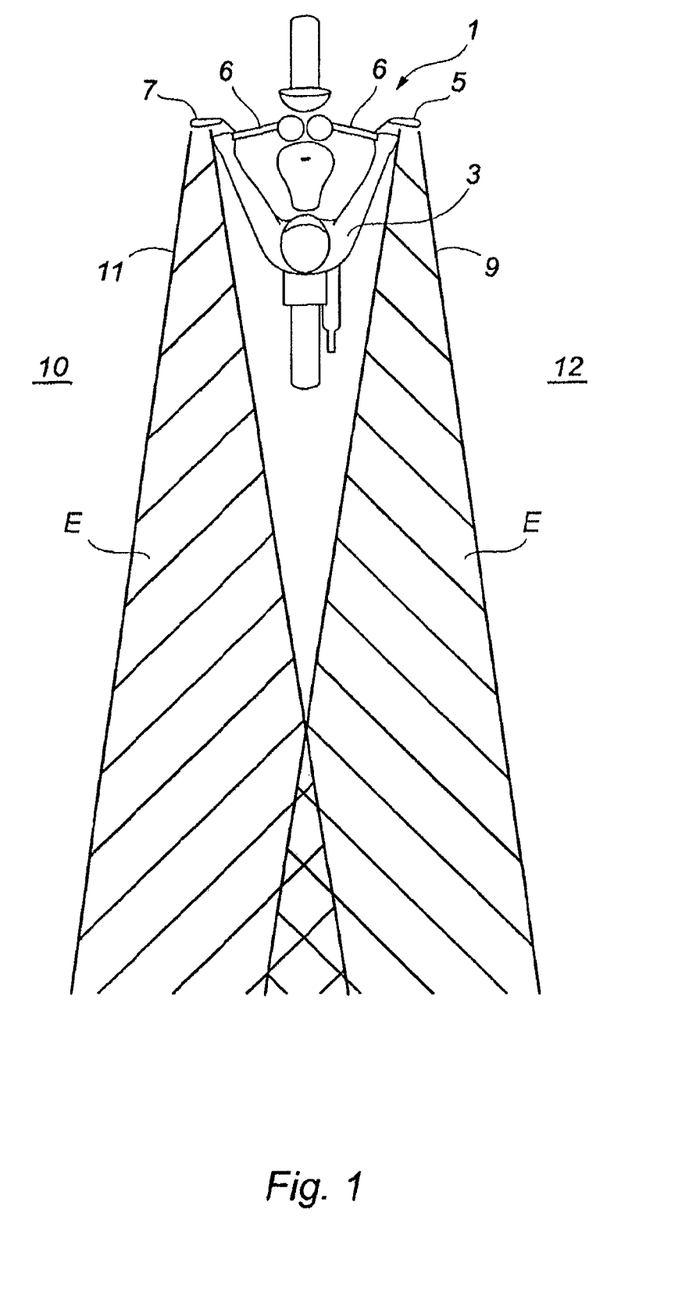
FIG. 1 is a top view of a motorcycle with conventional side mounted mirrors.

FIG. 1 is a top view of a motorcycle with conventional side mounted mirrors. The motorcycle 1 is shown with a rider 3 situated in the normal riding position. The handle bar has rear view mirrors 5, 7 mounted towards the ends of the handlebar 6. The fields of view from rear view mirrors 5 and 7 are shown in hatched areas 9 and 11 respectively. In this figure, the fields of view are shown for a situation in which the motorcycle is moving forwards in a straight line with the handle bar perpendicular to the main body of the motorcycle 1. It is clear from the illustration that large areas 10, 12 to the side and the rear of the motorcycle 1 are outside the fields of view provided by reflections from the rear view mirrors 5, 7. It is also clear that relatively good visual coverage is provided directly behind the motor cycle 1.

Figure 2:
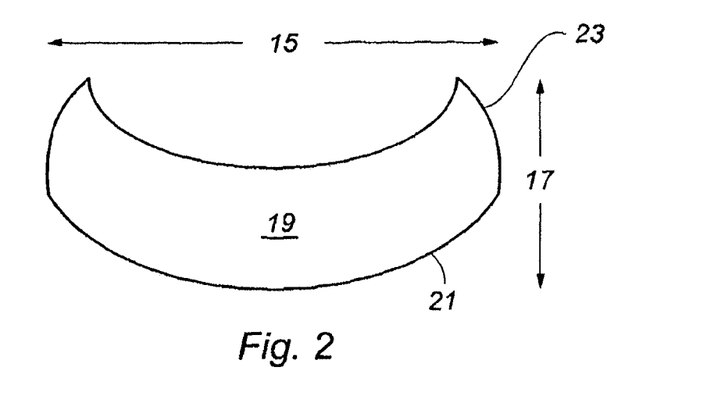
FIG. 2 is a perspective view of a first embodiment of the present invention.

FIG. 2 is the first embodiment of the present invention. This figure shows a mirror 13 which is designed to be mounted in the centre of a motorcycle at or near the control panels or on the wind shield. FIG. 2 shows the major axis 15 and mirror axis 17 of the mirror. These are shown because the curvature of the mirror may be defined with respect to the major axis 15, the minor axis 15 of the mirror 13 or both axes. In use, the major axis 15 of the mirror 13 will sit horizontally across the control panel or wind shield of the motorcycle. FIG. 2 also shows the reflecting surface 19 of mirror 13. In use this surface 19 will face the rider and provide enhanced visibility of the side and rear of the motorcycle.

In this embodiment of the present invention, the mirror is curved along the major axis 15 and along the minor axis 17. The curvature of the major axis is substantially, convex to allow the reflective surface 19 to reflect light from a large area around the motorcycle. Other shapes of reflecting surface, which are suitable for this function may be used. In addition, the reflecting surface 19 had a radius of curvature 23 on the minor axis 17. This is also shaped, to allow the reflection of light from a large area above and below a motorcycle.

Figure 3:
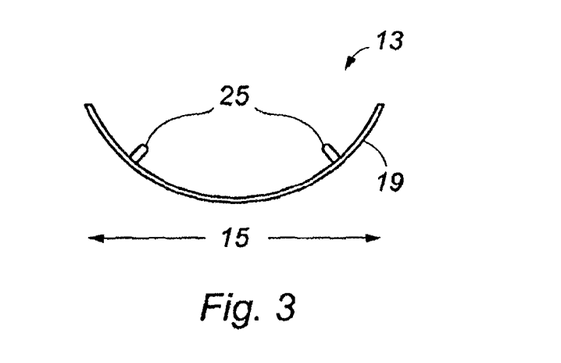
FIG. 3 is a downward view of the mirror as shown in FIG. 2 with the mounting lugs.

FIG. 3 is a plan view of the first embodiment of the present invention which shows the mirror 13, reflecting surface 19, longitudinal axis 15 and a pair of connecting lugs 25, which are spaced apart along the rear of the mirror 13. The connecting lugs form part of the coupling which is used to connect the mirror body to a motorcycle.

Figure 4:
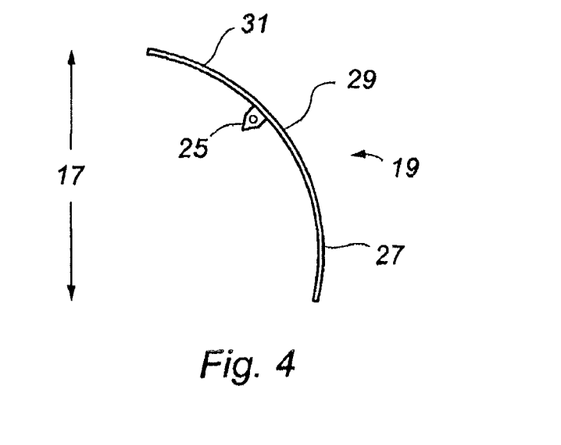
FIG. 4 is a side view of the mirror shown in FIGS. 2 and 3.

FIG. 4 is a side view of the first embodiment of the present invention as shown in FIGS. 2 and 3. The side view shows the reflecting surface 19, comprising 3 distinct sections extending along the minor axis 17 of the mirror 13. The three sections are a first or lower peripheral section 27, a central section 29 and a second or upper peripheral section 31. The first peripheral section 27 is designed to allow the rider to see low down and to each side of the motorcycle and also allows the rider to see the side of the motorcycle when it is leaning over to one side whilst cornering. This has a first radius of curvature which is higher i.e., has greater curvature than the central section 29, which is used to allow the rider to see the main areas to the side and rear of the motorcycle when riding straight ahead without tipping the motorcycle.

The third section 31 is at the top of the reflecting surface and has a third radius of curvature. This has been designed to allow the rider to see their own reflection and provide reflections from areas above and to the side of the motorcycle. The ability of the rider to see his own reflection provides a useful reference point for the rider with respect to other objects that the rider can see. This is because it gives a measure of the distortion which is inevitably present in a curved mirror.

Figure 5:
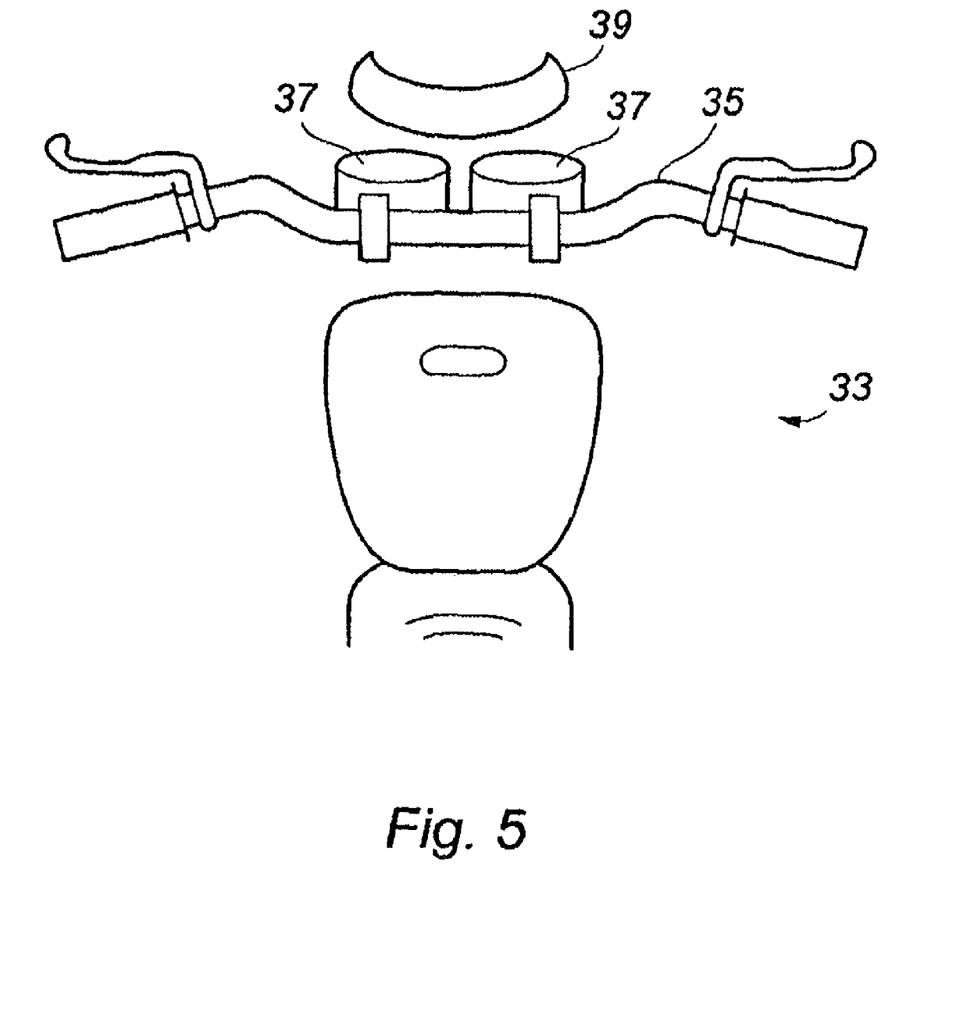
FIG. 5 shows the mirror of the first embodiment of the present invention mounted forward and above the instrument panel clocks directly in the riders line of view.

FIG. 5 shows a mirror in accordance with the present invention, in this case, the mirror of FIGS. 2 to 4, mounted in position up on a motorcycle. FIG. 5 shows the motorcycle 33 with a handlebar 35 and instrument panels 37. The mirror 39 is mounted on the front of the motorcycle to be forward from and above the instrument panel 37.

Figure 6A:
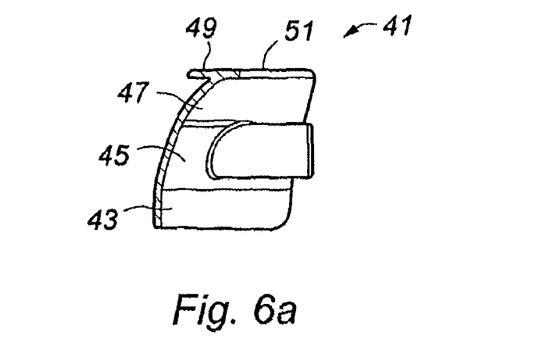
FIGS. 6a, 6b and 6c Are sectional plan and front views respectively of a second embodiment of the present invention.
Figure 6B:
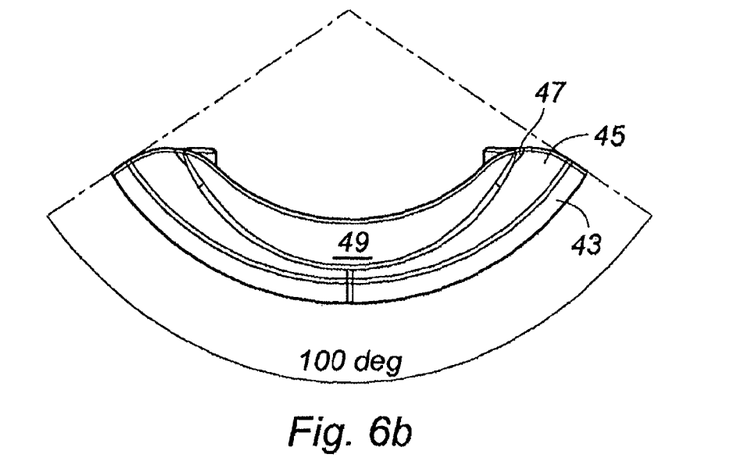
Figure 6C:
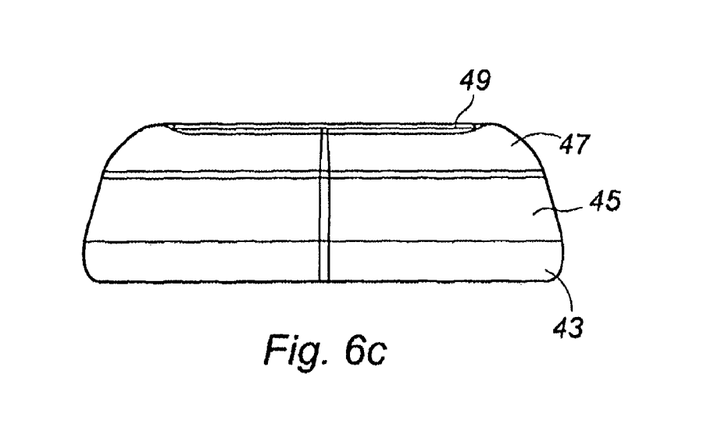

FIGS. 6a to 6c are side, plan and front views of another embodiment of the mirror in accordance with the present invention. FIG. 6a shows a mirror 41 with a reflecting surface having a first peripheral section 43 having a first radius of curvature, a central section 45 having a second radius of curvature and a top peripheral section 47 housing a third radius of curvature. The mirror 41 further comprises a top surface 49, which projects outwards above the top peripheral section and provides shading from extraneous bright light from the sky.

The radius of curvature as defined herein is the radius of an approximating circle passing through points on a curve. This therefore provides a measure of how curved a surface is in comparison to others. The lower the radius of curvature, the more curved the surface will appear. In this example absolute values of 65, 120 and 40 are given for the lower peripheral section 43, the central section 45 and the upper peripheral section 47.

FIG. 6b Is a plain view of the mirror of FIG. 6a and shows the first peripheral section 43, the second peripheral section 45 and a third peripheral section 47 which is partially covered by the projection of the top surface 49. This figure also shows the angle that is supported by the mirror as being 100 degrees.

FIG. 6b is the front view of the embodiment shown in FIGS. 6a and 6b

Figure 7:
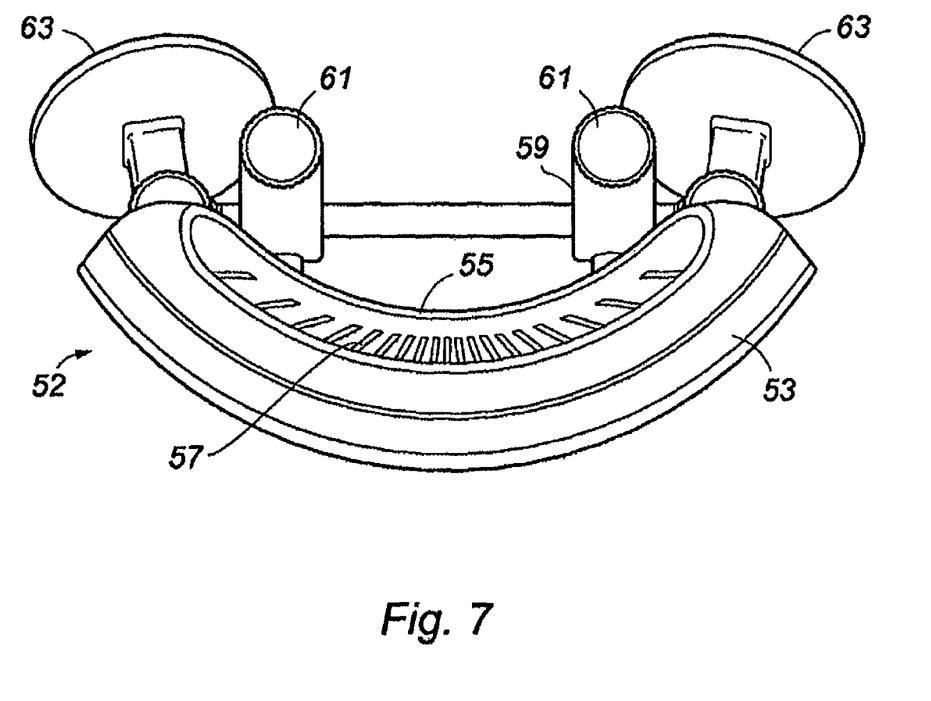
FIG. 7 is the top view of a third embodiment of the present invention.

FIG. 7 Is another embodiment of the present invention. The apparatus comprises a mirror 51 which is connected to a coupling 52 which attaches to a suitable surface in the centre of the motorcycle such as the instrument panel or wind shield. The mirror 51 comprises a reflecting surface and the top surface 55 which is provided with a referenced guide 57. This is marked with guide lines which represent the angle from the line of the centre of the motorcycle at which an object is viewed in the mirror. This provides further reference information to allow the rider to quickly judge the position of an object that the rider sees in the mirror. In an alternative embodiment, the guide lines contain numbers which represent the angle of the object with respect to the motorcycle.

The mirror 51 is provided with fixings or lugs 59 into which the bar 58 may be inserted and removably secured. The bar 58 is attached to pivotal connectors which may be adjusted to allow the section pads 63 to be attached to parts of the motorcycle surface which are angled with respect to one another. When the mirror is connected to the wind shield (not shown) as in this example, its position may be adjusted and the pivotal connector may be fixed in position by tightening screws to prevent further pivoting movement.

Figure 8:
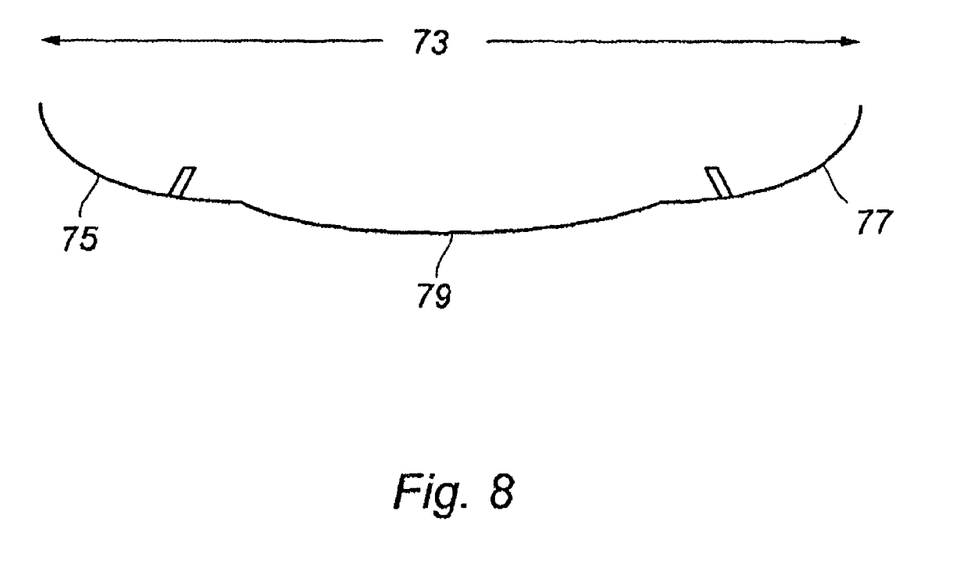
FIG. 8 is the plan view of the fourth embodiment of the present invention.

FIG. 8 Is a schematic side view of another embodiment of the present invention, wherein the radii of curvature of 3 sections of the mirror 71 along the major axis are different. The areas are denoted by reference numbers 75, 77 and 79.

Figure 9:
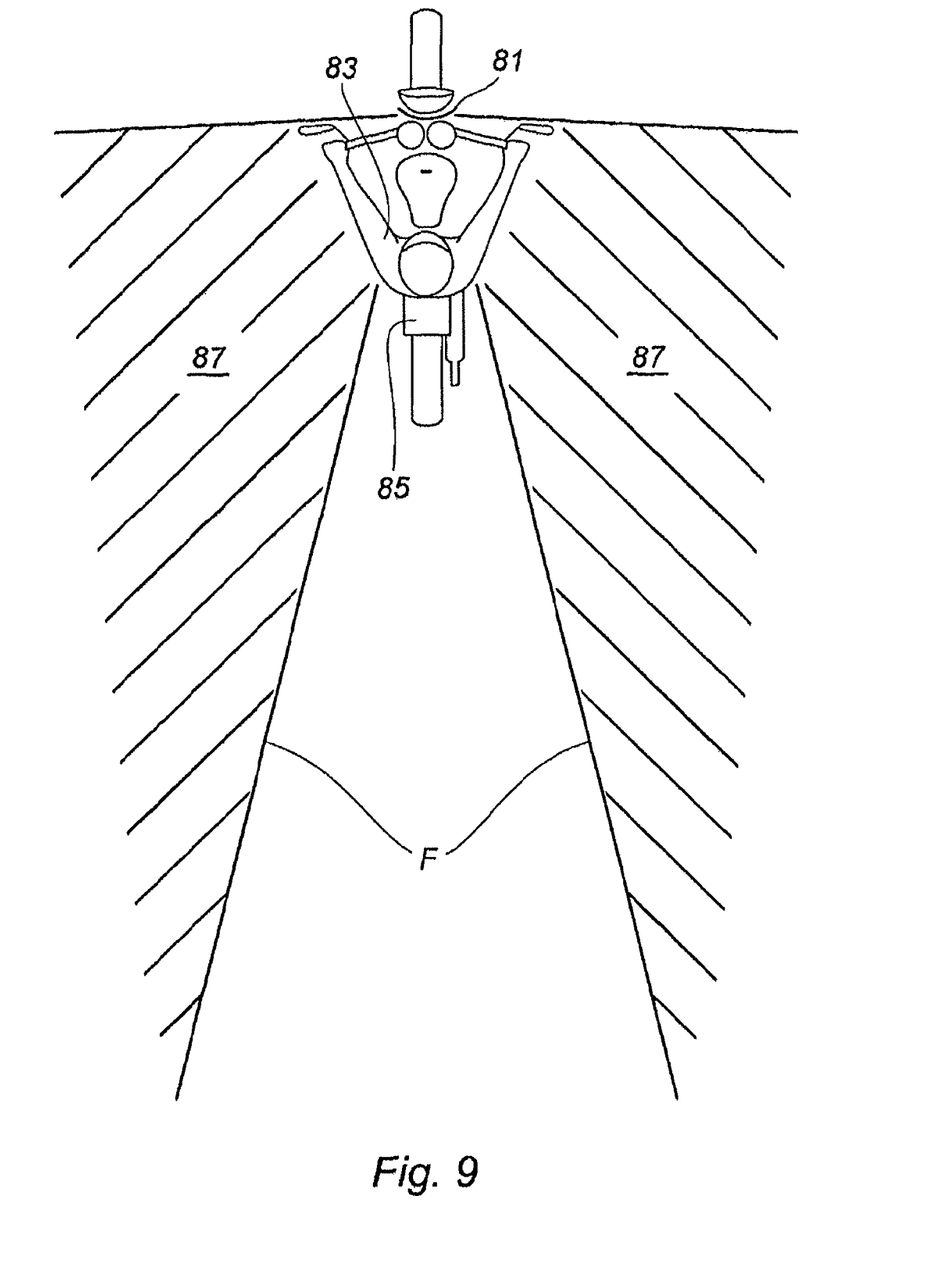
FIG. 9 is the top view of a rider using an embodiment of the present invention where the angle of lateral view of 170 degrees.

FIG. 9 is the top view of a motorcycle 85 and rider 83 using a mirror assembly 81 in accordance with the present invention which provides a viewing angle of 170 degrees, Reference number 87 shows the areas around the motorcycle which are viewable using the present invention. In this embodiment, the mirror is a centre mounted motorcycle wide angled mirror mounted above and forward of the instrument panel clocks to give at least 170 degrees horizontal visual coverage and with upper and lower increased curves, C and D, to give full vertical visual coverage so when the motorcycle is banking the blind spot areas are still covered. There are several mounting points depending on the motorcycle model including the wind shield mounting, fairing mounting, head lamp mounting, handle bar mounting. The mirror may be mounted on any suitable part, as long as the mirror is directly within the riders forward line of view.

Figure 10:
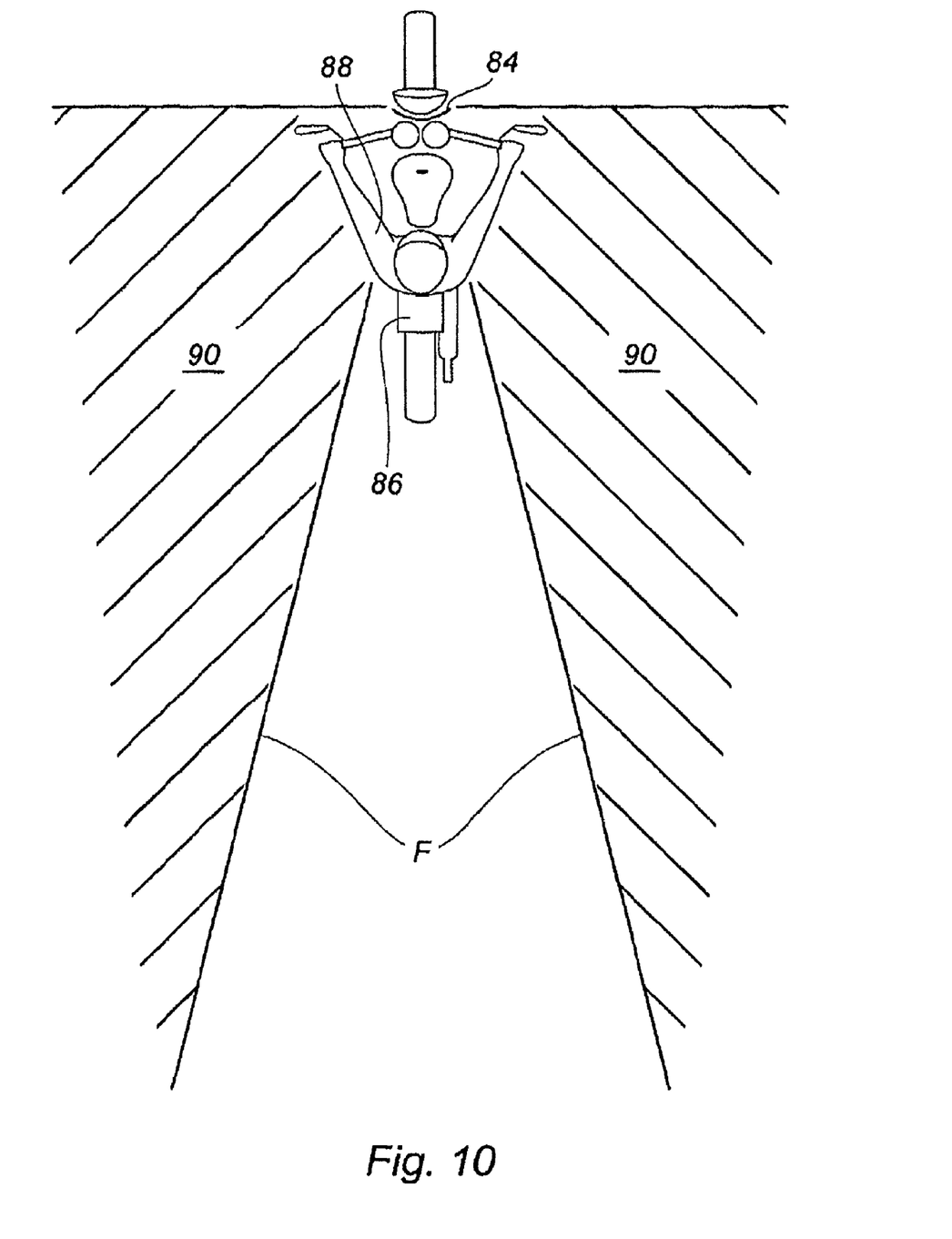
FIG. 10 is a top view of a rider using preferred embodiment of the present invention, where the angle of lateral view is 180 degrees.

FIG. 10 is the top view of a motorcycle 88 and rider 86 using a mirror assembly 84 in accordance with the present invention which provides a viewing angle of 180 degrees, Reference number 87 shows the areas around the motorcycle which are viewable using the present invention. In this embodiment the mirror is a wide angle centre mounted mirror that gives full coverage of the blind spot areas giving the rider visual warning of hazards that were previously in the unseen areas. The mirror, A, will give at least 180 degrees horizontal coverage, typically 190 degrees and due to its increased curves at C and D. It will still give full blind spot visual coverage when the motorcycle is banked over without reducing the image size too much. The mirror, A, is mounted forward and above the instrument panel clocks so as to be directly within the riders forward line of view so as easily seeing the blind spot areas without moving the head but just a glance downward.

Advantageously, the motorcycle centre mounted convex wide angle mirror of FIG. 10 gives 180 degrees vertical visual coverage including the rider and the blind spot areas.

It also gives vertical coverage from the sky line to the road surface even when the motorcycle is banked over because of the increased vertical axes curves and is mounted above and forward of the instrument panel clocks directly within the riders forward line of view below eye height.

Figure 11:
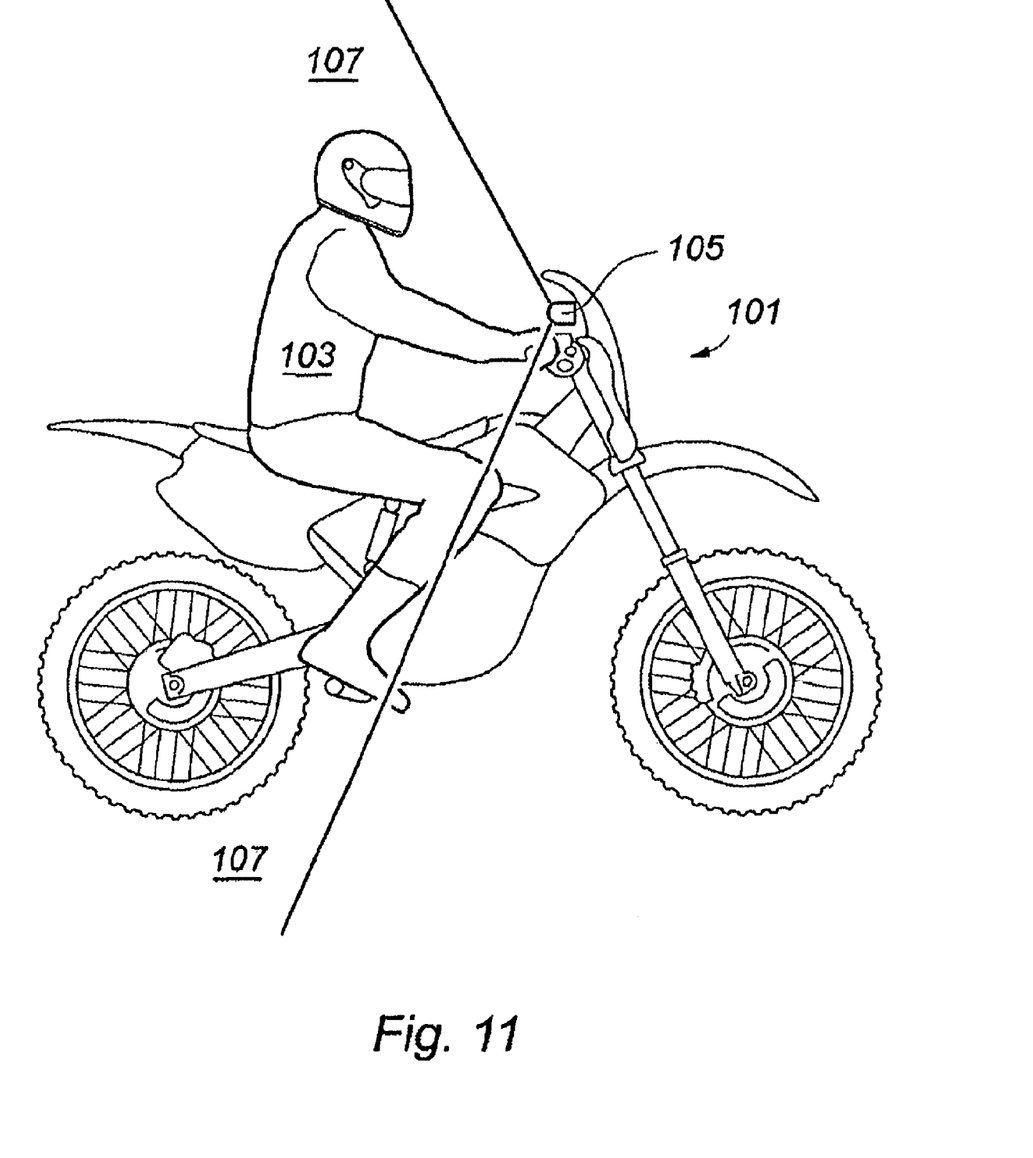
FIG. 11 is a side view of a rider using an embodiment of the present invention, illustrating the angle of the view above and below the rider.

FIG. 11 Shows a side view of a motorcycle 101 and rider 103, and shows the field of view 107 above and below the rider, using a mirror 105 in accordance with present invention.

Improvements and modifications may be incorporated herein without deviating from the scope of the invention.

The invention claimed is:

1. A mirror assembly for viewing the blind spot behind a motorcycle rider, the mirror assembly comprising:
    a mirror with a reflecting surface with a major axis and a minor axis, the major axis being perpendicular to the minor axis, the reflecting surface being curved along at least part of the major axis of the reflecting surface and along at least part of the minor axis of the reflecting surface to reflect light from positions at a wide angle of view to a position where a rider would be seated, in use; and
    mounting means for positioning the mirror centrally upon the motorcycle, wherein, the curvature of the reflecting surface and the central mounting of the mirror allow a rider to have sight of the area to the side and rear of the motorcycle in addition to the area viewable in side mounted rear view mirrors,
    wherein the mirror further comprises a reference guide positioned beside the mirror which has a scale that marks an angle between a centre of the motorcycle and positions upon the reflecting surface such that the rider may judge an angle between the rider and an object viewed in the reflecting surface of the mirror.

2. The mirror assembly as claimed in claim 1 wherein the reflecting surface is shaped to reflect a reference object to be viewable by the rider.

3. The mirror assembly as claimed in claim 1 wherein the reflecting surface provides a field of view of 170° in use.

4. The mirror assembly as claimed in claim 1 wherein the reflecting surface provides a field of view 180° in use.

5. The mirror assembly as claimed in claim 1 wherein the reflecting surface is convex in shape.

6. The mirror assembly as claimed in claim 1 wherein the reflecting surface is arranged in three sections along the major axis of the reflecting surface.

7. The mirror assembly as claimed in claim 6 wherein the three sections comprise a central section and two peripheral sections.

8. The mirror assembly as claimed in claim 6 wherein at least two of the three sections have a different radius of curvature.

9. The mirror assembly as claimed in claim 6 wherein all of the sections have a different radius of curvature.

10. The mirror assembly as claimed in claim 1 wherein the reflecting surface is arranged in three sections along the minor axis of the reflecting surface.

11. The mirror assembly as claimed in claim 10 wherein the three sections comprise a central section and two peripheral sections.

12. The mirror assembly as claimed in claim 10 wherein at least two of the three sections have a different radius of curvature.

13. The mirror assembly as claimed in claim 10 wherein all of the sections have a different radius of curvature.

14. The mirror assembly as claimed in claim 1 wherein the mirror comprises a top surface which projects outwards above the reflecting wherein the projection may act as a shade.

15. The mirror assembly as claimed in claim 1 wherein the coupling comprises connection means for removably attaching the mirror assembly to a motorcycle.

16. The mirror assembly as claimed in claim 15 wherein the connection means comprises at least one connector which is attachable to a surface of the motorcycle and mounting means to which the mirror assembly may be removably attached.

17. The mirror assembly as claimed in claim 16 wherein the mounting means is an elongate member adapted to receive at least one coupling on the mirror assembly.

18. The mirror assembly as claimed in claim 16 wherein the at least one connector is pivotably connected to the mounting.

19. A mirror assembly as claimed in claim 15 wherein the connection means comprises a pair of connectors which are spaced apart.

* * * * *